United States Patent
Nixon et al.

(10) Patent No.: US 6,633,688 B1
(45) Date of Patent: Oct. 14, 2003

(54) METHOD SYSTEM AND APPARATUS FOR PROVIDING IMAGE DATA IN CLIENT/SERVER SYSTEMS

(75) Inventors: Stuart William Nixon, San Diego, CA (US); Simon John Cope, Marangaroo (AU); Mark John Sheridan, Kewdale (AU)

(73) Assignee: Earth Resource Mapping, Inc., San Diego, CA (US)

( * ) Notice: Subject to any disclaimer, the term of this patent is extended or adjusted under 35 U.S.C. 154(b) by 0 days.

(21) Appl. No.: 09/560,368

(22) Filed: Apr. 28, 2000

(51) Int. Cl.[7] .............................. G06K 9/54; G06K 9/60
(52) U.S. Cl. ........................................ 382/305; 709/203
(58) Field of Search .......................... 382/305; 709/203, 709/219; 345/744

(56) References Cited

U.S. PATENT DOCUMENTS

| 5,710,835 A | 1/1998 | Bradley | 382/233 |
| 6,449,658 B1 | * 9/2002 | Lafe et al. | 709/203 |
| 6,501,854 B1 | * 12/2002 | Konishi et al. | 382/305 |

FOREIGN PATENT DOCUMENTS

| GB | 2325584 | 11/1998 |
| WO | WO 97/18527 | 5/1997 |

OTHER PUBLICATIONS

Search Report For PCT/US99/10276.
Chrysafis Et al, "Line Based, Reduced Memory, Wavelet Image Compression", Proceedings DDC '98 Data Compression Conference (CAT. No. 98TB100225), Snowbird, UT, USA, Mar. 30–Apr. 1, 1998, pp. 398–407.

Patent Abstracts of Japan, Publication No. 10283342, Publication date Oct. 23, 1998, Inventor Ozaki Yasuharu.

Efimov et al, "Efficiency Of Some Algorithms For Lossless Data Compression In Two–Dimensional Data Arrays", Avtometriya, 1997, Allerton Press, Russia, No. 6, pp. 72–81.

Anonymous, "Sub–Band Coding Hardware Assist", IBM Technical Disclosure Bulliten, vol. 34, No. 7B, Dec. 1991, US.

Cosman et al, "Memory Constrained Wavelet Based Image Coding", IEEE Signal Processing Letters, Vo. 5, No. 9, Sep. 1998.

* cited by examiner

*Primary Examiner*—Phuoc Tran
(74) *Attorney, Agent, or Firm*—Gray Cary Ware & Freidenrich

(57) ABSTRACT

A client/server system serves imagery to users with speed, efficiency, and desirable functionality. Clients are allocated the means to determine the image data necessary to generate views on an image. The clients issue requests for such necessary image data to servers who service the requests and send requested image data to the clients who then generate the views. The system responds quickly to changes of views resulting form user actions such as panning or zooming by enabling clients to determine which image data is needed that has not already been served and requesting service of only that data. Clients are also enabled to issue requests to cancel service of data previously requested, but unserved and no longer needed.

15 Claims, 5 Drawing Sheets

METHOD SYSTEM AND APPARATUS FOR PROVIDING IMAGE DATA IN CLIENT/SERVER SYSTEMS

BACKGROUND OF THE INVENTION

This invention relates generally to computing systems in which image data is made available to a plurality of users by means of a computing system architecture of the client/server type. More particularly, the invention concerns the determination of views on images by clients and the provision from a server of image data necessary to generate those views. In particular, the invention concerns the two-way streaming of data between clients and servers whereby clients stream requests for the provision of image data necessary to the generation of current views and requests for cancellation of image data previously requested as being necessary to previous views, but no longer needed. In the invention, a server responds to requests for provision and requests for cancellation from a plurality of clients by continually streaming to the clients image data for which requests have been received with no subsequent requests for cancellation.

Client/server architecture is a form of computer system organization in which computers or processors termed "clients" receive services from computers or processors termed "servers". Computing and storage tasks are divided between clients and servers in such a system, with servers being allocated certain tasks that are provided to clients as part of an overall computing scheme.

One particular application to which client/server computing architecture is particularly suited is the provision of access to large amounts of imagery where one or more clients invest users with the ability to request access to images through servers. In particular, enterprises that archive many images and services that provide access to large, detailed images benefit from client/server organization of computing resources by allocation of compression, storage, access to, and retrieval of image data through or by way of servers. Thus many clients can have access very quickly to large databases of images that are maintained by servers. Such images can include medical images, (derived by imaging processes such as X-ray, CRT, MfU, sonic imaging etc.), microfiche and microfilm, huge images of the Earth's surface, large archives of commercial images (real estate maps, multiple listings, product and service catalogs), three dimensional seismic images, and so forth. The imagery may comprise single images, arrays of photographs or other images, and video images. Such imagery may be multi-dimensional, and it may be static, incrementally moveable (drawing programs), or moving (TV, video, movies). In such applications, it is particularly desirable to provide users with fast access to images in such a way as to permit views to be generated on the images and supported by functions such as roaming and zooming.

An exemplary instance of client/server access to imagery would be provision of access to a database of very large images of the earth through a website on the World Wide Web, using network protocols such as HTTP, UDP, TCP/IP, WAP, and so on. Consider a client establishing communications with a server through a website in order to enable a user to view such very large images by means of the ability to roam over those images and to zoom in and out on regions of the images. An immediate requirement to satisfy such user needs is to serve such imagery to a client that is to display and/or process the imagery as it is being served from a server.

Such service can be provided by sending to a client a complete image in a standard format that enables some compression of the image. However, network and communications limitations would immediately restrict the size of an image that could be sent, especially when using slow communications channels such as modems or wireless networks.

A more modem image compression technique such as a discrete wavelet transform (DWT) provides better compression of images. However if an entire image is being served to a client, a substantial communications capacity between the client and the server and large storage capability at the client must still be provided.

It is possible to enable the client to request only a region and a level of detail (resolution) to be extracted from a larger image through the server. This permits selection of areas of images to be displayed and processed on the client. However, extraction, preparation, and processing of the requested image areas by the server can impose a significant load on the computational capacity of the server. As a result, such a scheme scales very poorly in that a server so endowed will rapidly approach a limit in the number of clients that it can handle.

Accordingly, there is a problem in utilization of the client/server architecture in the prior art to provide a large number of clients with fast, highly functional access to imagery through servers.

SUMMARY OF THE INVENTION

This invention solves the problem of the prior art by endowing clients with the functionality to set views on an image and to determine the image data necessary to generate those views. The clients are enabled to identify the image data that is necessary to generate the views. In this invention, the clients send requests to servers for the image data that is necessary to generate the views. At the same time, the clients are enabled to respond to user requests to change and/or update such views. In order to enhance the efficiency of communications between clients and servers, the invention enables the clients to issue requests to servers to cancel the provision of image data previously determined to be necessary to views that have been changed, under the condition that the image data necessary to those changed views has not yet been provided to the clients. In this regard, a server sees from the clients a steady stream of requests for provision of identified image data and requests for cancellation of previously-requested, but untransmitted and unneeded image data. The server serves those requests by transmitting to the clients image data for which provision requests have been received but for which cancellation requests have not been received.

As a result of such streaming the invention enables the use of progressively-transmitted image data from server to client, whereby a client can start generating a view as soon as some image data has been received, without having to wait for receipt of all image data necessary to generate the view.

The invention permits clients to extract portions of images through servers without heavily taxing the computing resources of the servers, which expands the number of concurrent client requests that can be served without significant degradation of server performance.

The invention enables a user to specify to a client a view on an image in terms of region and level of detail and permits the client to identify the image data necessary to generate that view.

The invention enables clients to interact quickly with a server in order to update imagery in the shortest possible time.

The invention provides a client with an image cache that permits the caching of a view at the client, thereby maximizing the efficiency of communications between clients and servers.

The invention enables a client to continually change and/or update a view even when all of the image data necessary to generate the changed or updated view has not been received from a server.

DETAILED DESCRIPTION OF THE PREFERRED EMBODIMENTS

Introduction

In the description following, the terms "image", "view" and "viewport" are accorded their usual technical meanings in the computer graphics and image processing arts. See, for example, *Fundamentals of Interactive Computer Graphics*, by Foley and Van Dam, Addison-Wesley, July 1984. This description employs the term "image data" to signify that information which represents an image and which can be acted upon by a computer to support a visual manifestation of the image by, for example, generating the image on a computer display device. An "image drawing site" is a processing location where a view is computed from image data. Typically the image drawing site will be part of, or associated with, a client. An image drawing site may also include or be associated with a display for manifesting the view visually.

This description uses static, two-dimensional imagery to illustrate and explain the invention. Nevertheless, the invention is intended to apply to any kind of imagery that can be served to a client in a client/server system. This includes imagery that is defined on two or more dimensions and that may be embodied in any one or more of the examples set forth in the Background section of this document.

Figure 1A:
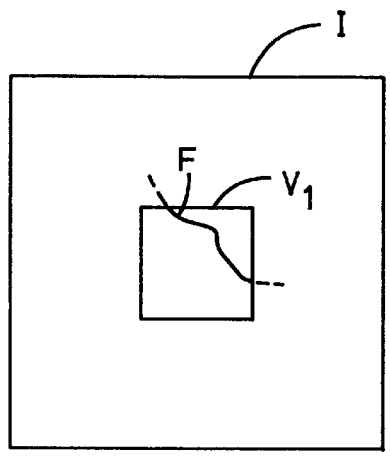
FIGS. 1A and 1B illustrate the setting and changing of a view on an image by panning.
Figure 1B:
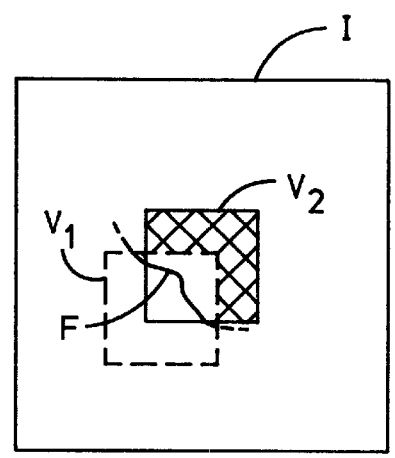

Consider FIGS. 1A and 1B wherein an image I has a feature F. Presume that the image I is very large, too large to display on a typical computer display device. Presume that a user having access to an image drawing process requests a view $V_1$ on the image I. The view $V_1$ is a portion of the image I that is observable by the user by way of, for example, a computer display device. Note that in FIG. 1A, the view $V_1$ includes a portion of the feature F. Presume now that the user changes the view on the image I to a new view $V_2$. As shown in FIG. 1B, the new view $V_2$ overlaps the old view $V_1$ in an area that includes a portion of the feature F. It should be evident that the portion of the view $V_1$ that is included in the area where the new view $V_2$ overlaps the old view $V_1$ can be used to generate $V_2$ by simply repositioning that portion. However, additional image data must be obtained in order to generate the new additional portion of the view $V_2$; such image data is represented by the crosshatched area of $V_2$; manifestly, that image data is less than all of the image data necessary to generate the view $V_2$.

Figure 2:
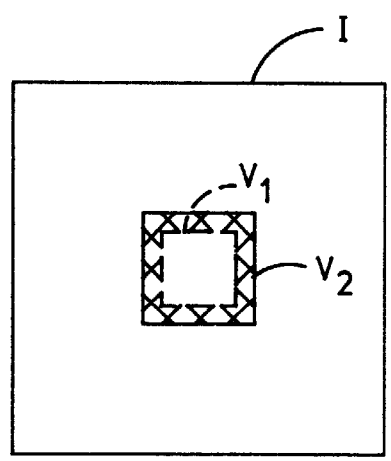
FIG. 2 illustrates the setting and changing of a view on an image by zooming.

Consider a change of view by zooming as illustrated in FIG. 2. In FIG. 2, a first view $V_1$ is established on the image I. The portion of the image I in the view $V_1$ is demagnified by zooming out to the view $V_2$. FIG. 2 shows the result of the zoom out; just prior to the zoom out, the view $V_1$ would have the outline within the view $V_2$. However a zoom out reduces the size of the portion of the image I previously observed in the view $V_1$, adding to the reduced portion the peripheral imagery indicated by the crosshatched area in the view $V_2$. As with FIGS. 1A and 1B, the image data used to generate the view $V_1$ can, with processing, be used in generating a portion of the view $V_2$. Further, the additional image data necessary to generate the crosshatched area in $V_2$ (less than all of the necessary image data) must be brought to the image drawing site in order to complete the new view.

Consideration of a change of view by panning (FIGS. 1A and 1B) and by zooming (FIG. 2) should make evident the fact that an update of a view may utilize image data necessary to the generation of a previous view, thereby reducing the image data that must be served in order to generate the entirety of the new view. With reference to FIG. 1B, for example, assume that image data necessary to generate the view $V_1$ was obtained in one or more data transfers from a server to a client where the views $V_1$ and $V_2$ are generated; in order to generate the entirety of the view $V_2$, the client need only request the additional data in the crosshatched area of view $V_2$ from a server, while processing the image data used to generate view $V_1$ in order to reposition the portion of the image that is common to views $V_1$ and $V_2$.

The Invention

FIG. 1B and FIG. 2 illustrate schematically two features of the invention. First, since views can be established at a client, the image data necessary to generate a view can be processed at the client so that imagery that is common to successive views can be retained and repositioned, thereby providing at least a portion of a view while additional image data that is not at the client is requested from a server. Second, the amount of data that must be requested from and provided by a server in order to update a view can be reduced to that image data that is necessary to generate the new view and is not resident at the client.

Another feature of the invention will be evident with consideration of FIGS. 1A and 1B. Importantly, FIGS. 1A and 1B are schematic in the sense that the image I is available through a server only as image data, not as a fully formed and displayed image. The views $V_1$ and $V_2$ do not "move" over the image, rather the image appears to "move" under or past the viewport established for the views. In reality, the viewport, which is static, is serviced by an image drawing process that generates from image data the portion of the image I that is presented in the viewport as the current view. A user is enabled to update a view by specifying to the image drawing process a region of an image and a level of detail (resolution or scale) for that region. The invention contemplates that a user may successively update a view faster than client/server communications can provide the image data necessary to construct all of the views in the succession. So, for example, a user may specify a view for which necessary image data is available at a client, and may update that view before the remaining image data necessary to generate that view is requested from and returned by a server. In fact, a view may be updated before a server even has an opportunity to service a request for necessary image data for the view. In such a case it would be very inefficient to have the server obtain the necessary image data for the now-updated view and transmit that image data to the client who longer needs it. In order to reduce the storage access and transmission inefficiencies that would result from such activity, the invention invests a client with the ability to cancel provision of image data which has been previously requested, but which has not yet been received, and which is no longer needed. The client does this by transmitting a request for cancellation of that image data to the server from which the data was requested. If the server has not yet retrieved that requested data, the server can avoid the necessity to obtain that data from storage. If the data has already been obtained from storage but not yet transmitted, the server can respond to the cancellation request by canceling the transmission of the data. This results in a significant increase in the operational efficiency of a server and in the transmission efficiency between the server and the client.

Image Data

Figure 3:
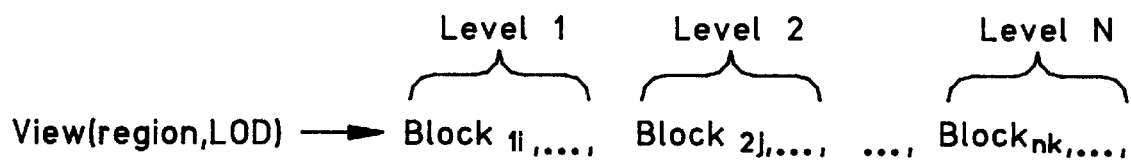
FIG. 3 illustrates a view established with respect to a particular embodiment of image data used to explain and illustrate this invention.

In this invention, it is presumed that the image data that is processed to generate a visual representation of an image, a portion of an image, or a view on an image has an organization of units that permits the units to be identified and handled individually. These units may comprise lines, sections, or tiles of uncompressed image data; alternatively, these units may comprise blocks of compressed image data. The inventors have found an especially effective application of the invention to image data produced by processing the digital image with a discrete wavelet transform (DWT), a well-known transformation that can be easily and effectively compressed. Transformation of images by a DWT routine is disclosed, for example, in copending, commonly owned U.S. patent application Ser. No. 09/188,833, filed Nov. 9, 1998, which is incorporated herein by reference. Wavelet transformation of an image produces a multi-level transform result set in which each level contains a plurality of subbands. The subbands in a level can themselves be partitioned and the partitions can be indexed in such a way that a subregion of an image can be identified and generated by indexing to the subband partitions in the levels that contain image data necessary to generate the subregion. Hereinafter, these subband partitions are called "blocks", with that term being one instance of the term "image data". Thus, it is possible for a client to define a view in terms of a region of an image and a resolution, and to identify image data necessary to generate the defined view. For image data obtained from wavelet transformation of an image, such image data can be identified by, for example, block numbers. Thus, as illustrated in FIG. 3, a view in terms of a region of an image and a level of detail (LOD) or resolution may be defined that maps or indexes to image data that is necessary to generate the view. In the case of a DWT transformed image, the mapping produces identifications of one or more blocks at a first subband level (Level 1), one or more identified blocks at the next subband level (Level 2), and so on. The defined resolution determines the number of levels in which blocks necessary to produce the view are identified. It is a characteristic of DWT processing that successively smaller amounts of image information are provided by the successively higher-numbered levels. In this regard, the information contained in the blocks identified for Level 1 provides image data that defines a higher percentage of the view than the higher number of blocks from Level 2, for example.

Moreover, DWT techniques have been made computationally efficient in the handling of such blocks. In this regard, once an image region and a level of detail or resolution have been defined, these parameter values can be utilized by known algorithms to calculate the indexes to the blocks necessary to generate the view defined by the image region and LOD.

Context

Figure 4:
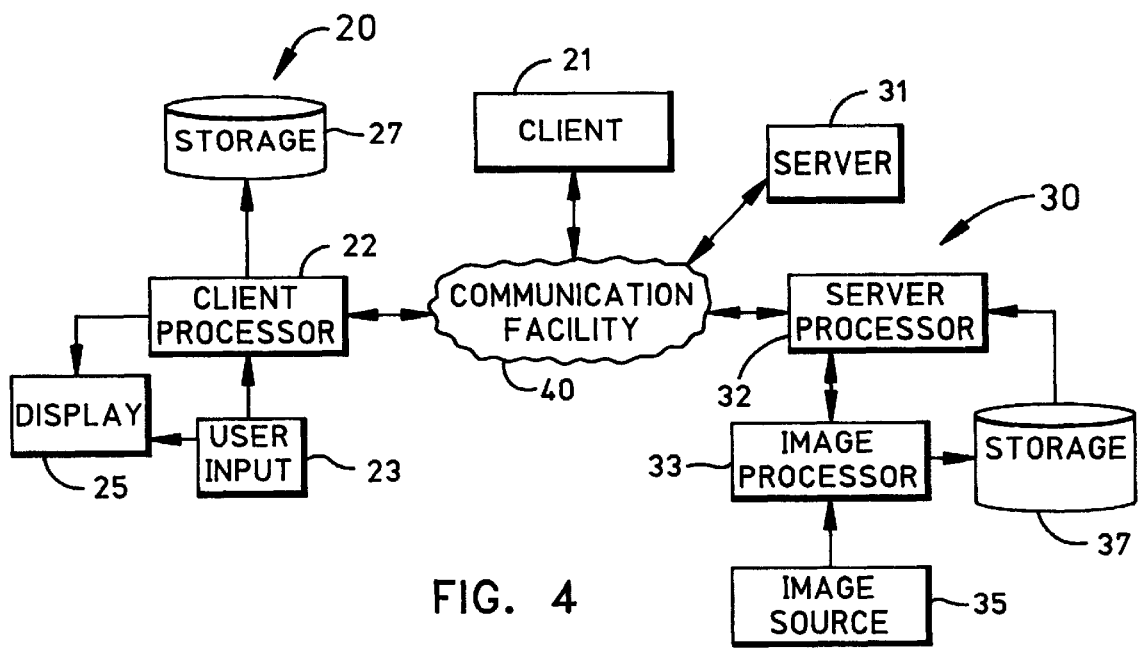
FIG. 4 is a block diagram illustrating a client/server computer system.

FIG. 4 is a block diagram illustrating the context in which the invention is applied. FIG. 4 illustrates a client/server system in which a user seeks a service at a client that, in turn, requests and receives service from a server. This organization centralizes certain services at a site (a server) where the services can be accessed from many other sites (clients). In other words, some computational task or set of computational tasks can be divided in a way that optimizes the allocation of the resources of a computing system to performance of the task or tasks. The client/server system of FIG. 4 includes at least one client 20 and may include a plurality of clients, another of which is indicated by reference numeral 21. The client 20 includes a client processor 22, a user input resource 23, a display resource 25, and a storage resource 27. The client processor 22 may comprise a programmed general purpose digital computer. The user input resource 23 may comprise one or more input devices for use by a human operator, such as a keyboard, a mouse, a touch pad, 15 and other similar and equivalent devices. The input resource may comprise other elements if the user is a process or a processor. The display resource 25 may comprise a display screen or panel. The storage resource 27 may be a hard disk or a hard disk array for storage of application programs and other program resources, such as an image drawing process. The client/server system of FIG. 4 further includes one or more servers such as the servers 30 and 31. Presuming that image access and processing is the computational task for which the client/server system of FIG. 4 is designed, the server 30 also includes secter processor 32 an image processor 33, an image source 35, and an image storage 37. The image source 35 provides one or more images to the image processor 33. The image processor 33 transforms each image into a set of image data which can be reversed transformed by an image drawing process at the server 20 to generate the image, or a view on the image. As the images are transformed by the image processor 33, they are stored in the storage 37. The clients and servers of the client/server system of FIG. 4 are connected for communication by a communication facility 40. The nature of the communication facility 40 depends upon the nature of the units of the client/server system of FIG. 4. The clients and servers may be individual processes running on a single or a federated computing facility; in this case the communication facility 40 will comprise an inter-process communication operator. In the case where the clients and servers are physically separated, the communication facility 40 can comprise a network or a standard computer communication system.

Client/Server Architecture and Operations

Figure 5:
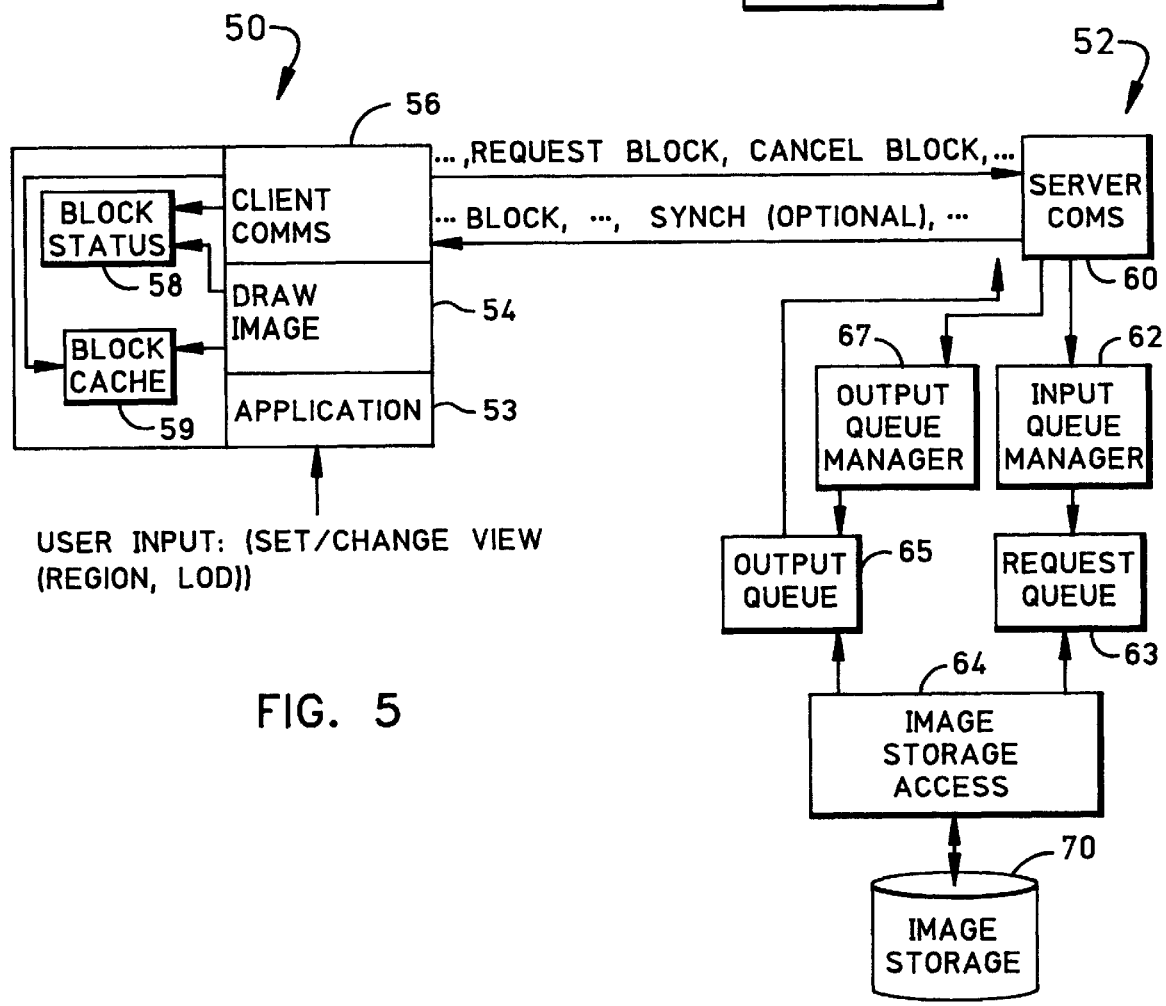
FIG. 5 is a block diagram illustrating details of a client and a server in the client/server system of FIG. 4.
Figure 6:
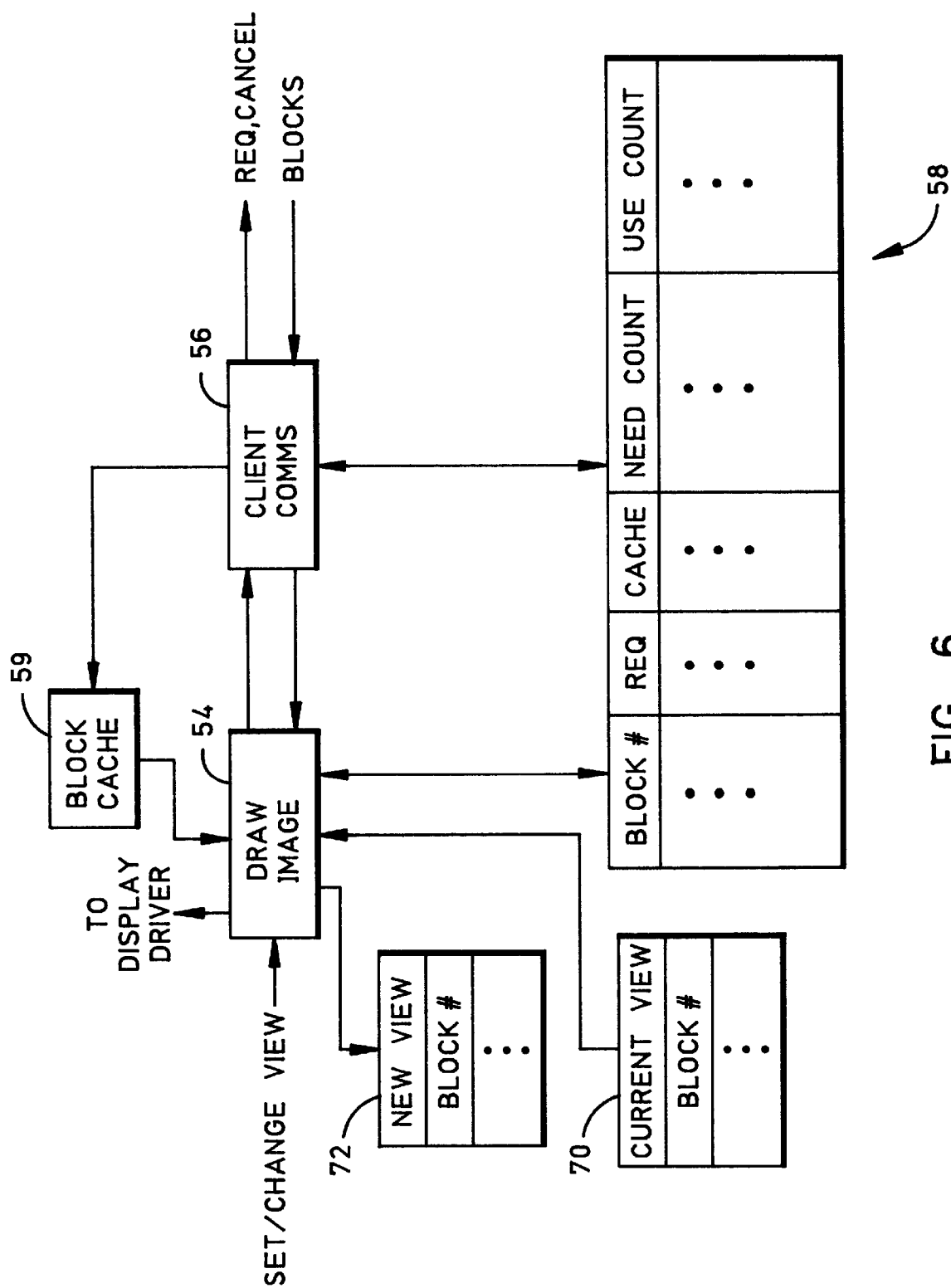
FIG. 6 is a block diagram illustrating the architecture of a client according to the invention.
Figure 7:
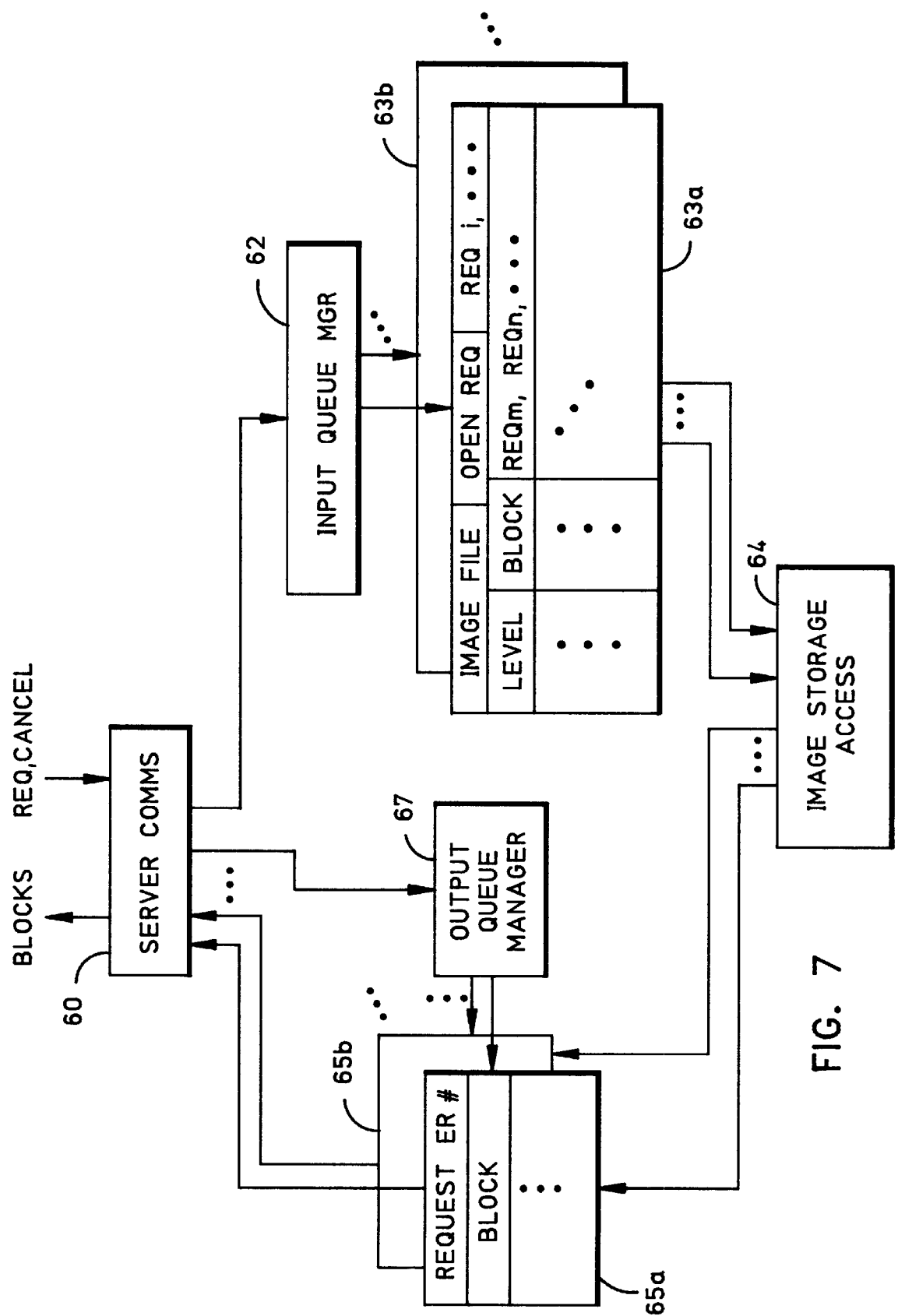
FIG. 7 is a block diagram illustrating the architecture of a server according to the invention.

Refer now to FIGS. 5, 6, and 7 which illustrate a client/server interface in which the invention is implemented. This explanation is based upon the proposition that images that are accessed and processed have been transformed, preferably by a DWT, and that the transform results have been compressed. In this regard, images are transformed and compressed to yield image data in the form of blocks. When a view is requested at a client, the blocks necessary to generate the view are identified at the client and requested from the server. The server provides the blocks to the client, where an inverse transform process decompresses and inversely transforms the blocks to produce data that supports generation of the visual manifestation of a view on an image by means of a display device. Wavelet transformation is well-known in the art, both as to specific transform implementations and as to implementations for partitioning, storing, accessing, and handling transformed, compressed image data.

However, while it is useful and convenient to describe the invention in terms of blocks obtained by DWT techniques, this is not intended to limit the practice of the invention only to image data produced by wavelet transformation. Indeed, the application of the invention to client/server systems in which image data is accessed through a server will provide efficiencies and benefits such as increased client/server communication bandwidth and more efficient utilization of server storage access, no matter what the form of the image data is.

In FIGS. 5, 6, and 7, only a single client and a single server are illustrated and discussed. This is in no way intended to limit the application of the invention to a single client and a single server. In fact, the inventors contemplate use of their invention in a client/server system having one, or many clients, and one, or many, servers.

In FIG. 5, a client 50 opens a connection for communication with a server 52 in order to access image data through the server. The client 50 executes an application process 53, an image drawing process 54 ("draw image"), and a client communications process ("client comms") 56. These processes operate cooperatively and execute with reference to data structures 58 and 60. The data structure 58 ("block status") contains the current status of image data ("blocks") that are necessary for generation of views by the draw image process 54. The block cache 59 stores blocks necessary for the generation of views by the draw image process 54. The server 52 comprises a server communications process ("server comms") 60, an input queue manager 62, a request queue 63, an image storage access process 64, an output queue 65, and an output queue manager 67. The image storage facility 70 is connected to the server 52.

The client 50 and server 52 are connected for communications by a communication facility which is not shown explicitly in FIG. 5. Nevertheless, communications are established between the client comms process 56 and the server comms process 60, with the client comms process 56 sending a stream of requests for provision of blocks interwoven with which are requests for cancellation of blocks. In this regard, a request for a block (REQUEST BLOCK) is a request that identifies the client 50, addresses the server 52, and identifies the requested block. A request to cancel a block (CANCEL BLOCK) identifies the client 50, addresses the server 52, and identifies the block to be cancelled. In response to the stream of requests from the client 50, the server 52 sends to the client 50 a stream of blocks (BLOCK) addressed to the client 50, identifying the server 52, and identifying the blocks. Generally, the stream of requests from the client 50 is asynchronous with respect to the stream of blocks from the server 52. Some implementations may require synchronization between the client 50 and the server 52 for specific reasons, in which case a stream of blocks from the server 52 may include a synchronization message (SYNCH); however this is optional and not necessary to the practice of the invention.

In operation, the client 50, through the application process 53, receives a user input to set or change a view. The request is parameterized by region and level of detail (LOD) which may also be specified as resolution. In this application a user may signify a human being, a process, or a combination thereof. The application process 53 passes the user input request to the draw image process 54 which converts the specified view into a set of blocks. The draw image process 54 enters a set of blocks for the specified view into the block status data structure 58. The client comms process 56 continuously monitors the block status data structure 58 and, depending upon its contents, generates requests for a blocks that are identified in the block status data structure 58. The requests are sent to the server 52. As the blocks are received from the server 52, the client comms process 56 enters the blocks into the block cache 59 and updates the status of the blocks in the block status data structure 58 to denote their arrival and storage in the block cache 59. The draw image process 54, with reference to the block status data structure 58 accesses the blocks in the block cache 59, processes them as appropriate for generation of a view, and causes the view to be displayed. In response to receipt of a succession of user inputs setting or changing a succession of views, the draw image process 54 may indicate in the block status data structure 58 that blocks for a previously requested view are no longer required. In its continual monitoring of the block status data structure, the client comms process 56 notes blocks for which requests have been sent to the server, which have not yet been received, and which are no longer needed by the draw image process 54. For those blocks, the client comms process 56 generates and issues CANCEL BLOCK requests, weaving them into the stream of REQUEST BLOCK requests that flow to the server 52.

The server 52 responds to REQUEST BLOCK requests by queuing the requests in a request queue 63 that is managed by the input queue manager 62. The request, queue 63 is accessed continuously by the image storage access process 64 and blocks that are queued in the request queue 63 are retrieved from the image storage 70. Blocks retrieved by the image storage access process 64 are queued in the output queue 65 for communication to the client 50. The output queue 65 is managed by the output queue manager 67. When a CANCEL BLOCK request is received by the server comms process 60, it is issued to the input queue manager 62 and the output queue manager 67. If the block which is to be cancelled is still in the request queue 63, the input queue manager 62 removes it from the request queue 63. If the block has already been retrieved and placed in the output queue 65, but not sent to the client 50, the output queue manager 67 removes it from the output queue 65. The server comms process 52 continuously monitors the output queue 65, removing blocks from that queue and sending them to the client 50.

Client Architecture and Operations

FIG. 6 illustrates the functional and data structure architecture of the client 50 in greater detail. In FIG. 6, the block status data structure 58 and two other data structures 70 and 72 are presented in the form of tables. This is for convenience of illustration and to enhance understanding of those data structures; in fact, those data structures may be rendered in any form that is convenient for speedy and efficient processing. Nevertheless, as FIG. 6 illustrates, the block status data structure 58 contains a plurality of entries or members, each of which includes a block number field (BLOCK#), a request flag (REQ), a cache flag (CACHE), a first count field (NEED COUNT), and a second count field (USE COUNT). The block number field identifies a block. The request flag is a two-state flag, as is the cache flag. The two count fields contain numbers that are incremented from an initial value (preferably zero) and decremented according to the processing to be described. Presume that the draw image process 54 has received a view request and determines, by processing the values in the region and detail parameter fields of the request, the blocks that are necessary to generate that view. Preferably, this is done algorithmically be a process (not shown) that calculates the blocks for a view. However, in order to illustrate the point to be made, the accumulated results of this process are presented in the form of lists (70 and 72). Therefore, a view list 70 (CURRENT VIEW) contains the identifications of the blocks necessary to generate the view. Presume that the current view is the first view requested and that it has not yet been displayed. In this case, the draw image process 54 makes an entry into the block status data structure 58 for each block in the list 70. For each entry, the block number is entered, the request and cache flags are reset, the need count is initialized to zero and then incremented by one, and the use count is initialized to zero.

When the view has been entered into the block status data structure 58, the draw image process 54 provides an indication to the client comms process 56 that a view has been entered. At some time following receipt of the indication, the client comms process 56 inspects the contents of the block status data structure 58 and, for each block identified therein having a need count greater than the initial value (zero, for example) the request and cache flags are inspected. Assuming both flags are reset, the client comms process 56 sets the request flag for the block and issues a request for the block. If either flag is set, the client comms process takes no further action to obtain the block.

Assume now that a user request to change the view is received. With the blocks in the list 70 designated as the current view, the draw image process 54 determines the identity of the blocks necessary to generate the newly-requested view and enters the block numbers into the view list 72. The draw image process 54 then processes the block status data structure 58. Since the current view is being rests, replaced, or updated, the draw image process 54 finds, for each block in the list 70, the corresponding entry in the block status data structure 58, and decrements the need count by one. When every block in the current view has been processed in this way, the draw image process 54 determines all blocks of the new view (list 72) and compares each of those block to each entry in the block status data structure 58. If an entry for that block exists in the block status data structure 58, and the cache flag is not set, the draw image process 54 increments the need count for that block; if the cache flag for that block is set, the block is in the block cache 59 and no further processing is necessary to obtain it. If a corresponding entry does not exist, the draw image process 54 creates an entry in the block status data structure 58, entering the block number, resetting the request and cache flags, initializing the need count and incrementing it by one, and initializing the use count. The draw image process 54 notifies the client comms process 56 when the block status data structure 58 has been processed in response to the updated view. In response, the client comms process 56 processes the block status data structure 58. For any block having an entry in the block status data structure 58 whose request flag is set but whose need count is zero, the client comms process 56 generates a cancel request, identifying the block number and sending it to the server, and then resetting the request flag. For each entry in the data structure 58 whose request and cache flags are reset and whose need count is greater than the initial value, the client comms process 56 dispatches a request for the identified block and sets the block's request flag. During this processing, the client comms process 56 takes no action for blocks in the block status data structure 58 whose need counts are greater than zero and whose request flags are set.

In the best mode of the invention, the blocks to be cancelled are determined first, and a cancel request is dispatched, then the blocks necessary to the current view that are not at the client are processed. Further, because of the nature of the algorithmic process by which blocks necessary to a view are identified, groups of blocks can be identified by a block number range, thus permitting the client comms process to process the block status data structure 58 quickly and to request dispatch and cancellation of groups of blocks.

As blocks are received from the server, the client comms process 56 conducts further processing of the block status data structure 58. When a block is received from the server, the client comms process 56 enters the block into the block cache 59 and finds the entry for the block in the block status data structure 58, resetting the request flag, setting the cache flag, and initializing the need count to zero.

Maintenance and management of the block status data structure 58 implicate a time out period for requested blocks which will elicit a subsequent request. Maintenance and management of the block cache 59 is by way of the cache flag and use count field in the block status data structure 58. When a block is placed in the block cache 59, its cache flag is set in the data structure 58. Whenever it is in a cache, a block may be used to generate a view; the use count field in the data structure 58 is used for this purpose. When a view is generated or refreshed or renewed, all of the blocks in the block cache 59 that are used to generate the view have their use field counts incremented; those blocks in cache that are not used in the current view have their use field counts decremented. Use management of the block cache 59 is therefore supported by the use count fields of the data structure 58; blocks in the block cache 59 can be deleted from the cache once their use counts decline to some predetermined threshold.

Server Architecture and Operations

Processing at a server according to the invention may be understood with reference FIG. 7. Preliminarily, prior to generation of requests to send and requests to cancel blocks for views on an image, a client will open a connection with a server for an image and then will open the image at the server. In response, the server will open a file (63a, 63b . . . ) for the requested image and will establish an output queue (65a, 65b, . . . ) for accumulation of blocks to be sent to the requestor. When the image file is opened by the client, the server will send file header information to the client that contains information about the image, such as size and dimensions, and information about the image data structure, size, and so on. In this latter regard, the image data information, in the case of DWT results, includes information that supports algorithmic calculation of blocks and their identifications. Once an image file is opened, another request to open the same image will not result in another file for the same image; instead, the same image file will be used for the processing to be described; however, the file header information will be sent to the client requesting opening of the image. This enables the server to service requests for image data for a particular image that comes from multiple sources such as multiple views on the image from one client, as well as requests from multiple clients for the same image. Further, once a requestor queue has been established for a client, all blocks for any image requested by that client will be queued to the single requestor queue. Now, presuming the opening of an image by a requestor, if not yet opened, an image file 63a will be opened for that image and, in that file, a request queue data structure will be established. For file management, an image file has a field or list (OPEN REQ) of requestors who have issued OPEN IMAGE requests for the file. When one or those requestors issues a CLOSE IMAGE request, that requestor is removed from the field. When the last requestor is removed, the file may be closed. In this regard, a request queue in image file 63a (IMAGE) has entries that include LEVEL, BLOCK, and REQ (requestor) fields. It should be noted that the level field is useful for an implementation of the invention that is based on DWT processing. In this regard, recall that blocks are subdivisions or partitions of subbands in transform result levels and that, according to the hierarchy of levels in a wavelet transformation process, the higher the level, the more image detail contained in the image data found in that level. Further, determination of the level is inherent in DWT processing so that when a block is identified, its level can also be identified either by the client or the server. In any event, in DWT implementation a particular advantage is obtained by entering blocks into the queue according to their levels. In this regard, the highest level blocks (Level 1) would precede the next highest (Level 2), and so on. The block field identifies a requested block and the request field has provision for multiple entries so that one or more requestors can be entered into this field (requestors being clients that have requested the block). The image storage access process 64 conducts I/O with image storage in order to retrieve blocks that are queued in the image files 63a, 63b, . . . When a block is retrieved from storage, it is entered into the queue of every requestor (client) that has requested it. The requestor queues are indicated by reference numerals 65a, 65b, . . . When a request for a block is received, the server comms 60 notifies the input queue manager 62. The input queue manager 62 locates the file of the image in which that block is contained and enters the block into the queue of the image file. If this is the first request for the block, an entry is created that puts a value in the level field, identifies the block in the block field, and enters the identity of the requestor in the requestor field. If an entry has already been created in the queue, the input queue manager 62 simply adds the requestor identity to the requestor field for that block. When a cancel request is received from a requestor, the request is passed to the input queue manager 62 and the output queue manager 67. If the block has not yet been retrieved, the input queue manager 62 locates the entry for the block and deletes the requestor from the requestor field. If this clears the requestor field, the entry may be removed from the queue. If the block has been retrieved and placed in one or more output queues, the entry for the block in the input queue for its image will have been removed by the input queue manager 62 in response to notification by the input storage access process 64. The output queue manager 67 inspects a cancel request, and indexes to the queue of the requestor; if the identified block is in the requestor queue; it is deleted from the queue. It may be the case that the block has been transmitted before the cancel request can be acted upon; in this case, the block will have been removed from the requestor's queue and no action will be taken by either the input queue manager 62 or the output queue manager 67.

In the case where image data is obtained by DWT processing, I/O efficiency can be enhanced by an "elevator" method of access. In this regard, for each image file, the image storage access 64 will process the input queue in an image file progressively by obtaining from storage, in a first step, only blocks in the highest level, and then in the next step, blocks in the highest and the next highest level, and so on. In other words, for level n, blocks queued for levels $L_1, \ldots L_n$ are retrieved. This an effective storage access technique for image data generated by wavelet transformation because the blocks most frequently accessed are those in the highest levels.

Method According to the Invention

Figure 8:
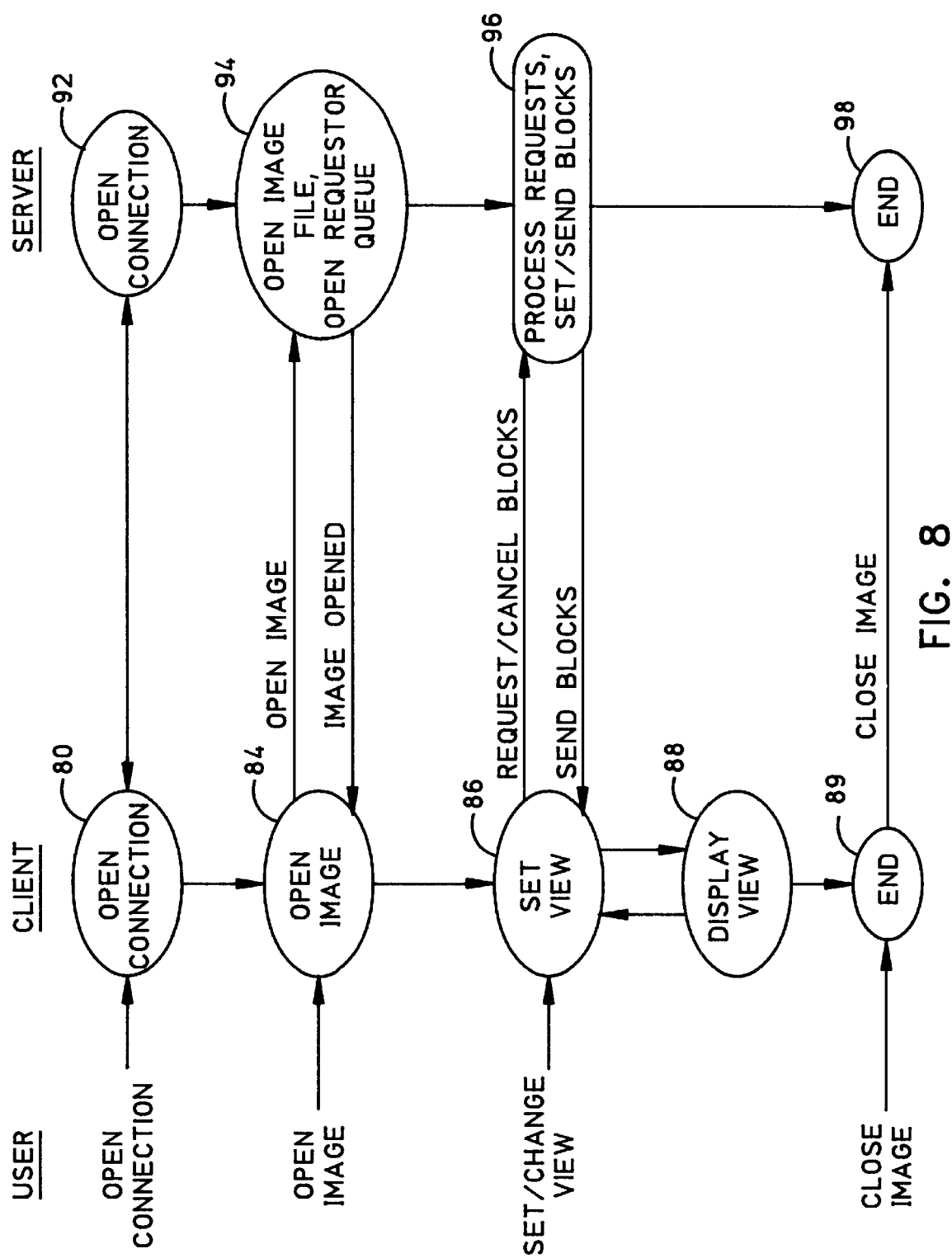
FIG. 8 is a flow diagram illustrating a method which embodies the invention.

FIG. 8 is a top-level flow diagram illustrating a computer-executable process that implements the invention. The process contemplates a client/server computer system in which one client, or many clients, communicate with one server or many servers in order to implement the invention. Thus, although the figure presents the method in terms of a single client and a single server, this is not intended to so limit the practice of the method. In FIG. 8, a client receives an OPEN CONNECTION request from a user to open a connection with a server and, in step 80, opens the channel or channels necessary to communicate with a server identified by the request. Next, the user opens an image with an OPEN MAGE request received by the client in step 84. The client activates the processes and establishes the data structures necessary to generate views on the image and to communicate with the server to obtain image data necessary to generate those views. Next, the user sets a view or changes a view on the image that has been opened and the client responds by set view processing in step 86 as discussed above with respect to FIGS. 1A–6. In addition, the image drawing process (the draw image process 54, for example) at the client processes the image data to display a view in response to a set or change request; this is accomplished in step 88. It is contemplated that successive requests for setting and/or changing views will cause the relevant processes to cycle between steps 86 and 88 a number of times. During the set view step 86, the client emits a stream of requests to the server to obtain and return blocks and to cancel blocks that have been previously requested, not received, and are no longer needed. Eventually the user closes the image, resulting closure processing in step 89. At the server, a request from a client to open a connection elicits open connection processing in step 92. When an image is opened, the server in step 94 opens a file for the image, if one has not already been opened in response to a previous request (from another client, for example) to open the image. The server also checks to see whether a requestor queue has been opened for this client; if one has (in response to a request from the same client to open another image) then the server awaits a stream of requests from the client. As the requests are received in step 96, they are processed as described above, with the result that the server gets and sends blocks that are necessary to the generation of views on the image, canceling requests and/or queued blocks in response to corresponding requests for cancellation that are received before the blocks were sent. When the server is informed that the client has closed the image in step 98, the relevant processes are informed. If there are no other requesters indicated for the image, the file is closed.

Generating Views

The architecture, data structure, and operations thus far described have explained how views are set and how the image data necessary to generate those views is obtained speedily and efficiently. Reference is given once again to FIGS. 5 and 6 in order to understand how the draw image process 54 utilizes blocks in the block cache 59 and information in the block status data structure 58 to cause a visual manifestation of a view. Advantageously, the draw image process 54 begins to cause the generation of the current view even under circumstances where all of the image data necessary to generate the view has not yet been received. In this regard, the draw image process 54, using the current view list, can determine which blocks necessary to the current view are in cache and can process those blocks by decompression, transformation, and translation to cause the generation of at least a portion or portions of a view before all of the image data necessary to generate the entire view is in the block cache 59. In this regard, when the draw image process 54 undertakes the processing described with reference to the view lists 70 and 72, if there is at least one block in cache that is necessary to the new view, the current view is refreshed using what image data is available in the cache to generate the view. This can be determined by examination of the cache flag during view processing by the draw image process 54. Recall that when the client comms process 56 receives a block, it inspects the block status data structure 58. If the request and cache flags for the block have been reset, a cancel request for the block has previously been sent. Such blocks can either be discarded or entered into the block cache. If, upon receiving a block, the client comms process 56 determines that the request flag for the block is set, the block is entered into the block cache 59, the block's request flag is reset, and its cache flag is set. Preferably, the receipt of a block by the client comms process 56 will generate a view update trigger provided to the draw image process 54. The particular strategy for such a view update can accommodate either blocks whose request flags are set or any block received by the client comms process 56. A refresh of the current view ("refresh current view trigger") can occur at any time; however, it is typically generated by either of two events: a change or update of a view where there is already some image data necessary for that view in the block cache 59 and the receipt and entry of blocks into the block cache 59. When a refresh current view trigger occurs, the draw image process 54:

1. Causes the generation of the current view by inverse transformation, dequantization, decoding and translation from the blocks that are necessary to the view and are in the block cache.
2. Treats any block not in the block cache 59 as a "zero block" with a value of zero, which enables the draw image process to still generate an incomplete view containing a portion or portions of the current view.

The generation of the complete current view may take some time, and one or more additional refresh current view triggers may occur before the view is complete. In response, the draw image process 54 can either set a "refresh view trigger" state, which is ignored until all of the blocks necessary to generation of the complete view are in the block cache 59, or abort the current view generation and initiate the generation process.

Those skilled in the art will appreciate that a client having the capacity to operate according to this invention may have multiple, concurrent, overlapping operations to perform. These operations can include generating new view requests from the application process, responding to refresh view triggers, responding to update view triggers caused by blocks received from a server, and generating the current view (which may be caused by any one or more of several events). These separate operations may be performed in multiple threads, with the result that the application process would have seamless and fast interaction with served imagery, even over slow modem lines. Alternatively, the application can serialize requests, with a slight degradation in user/application interactivity.

With this invention, a server has a very light CPU and disk load to service requests for any image.

Clearly, the other embodiments and modifications of this invention will occur readily to those of ordinary skill in the art in view of these teachings. Therefore, this invention is to be limited only by following claims, which include all such embodiments and modifications when viewed in conjunction with the above specification and accompanying drawings.

We claim:

1. A method for accessing image data through a server, comprising:

receiving successive user requests for views on an image;

determining image data necessary for an image drawing site to set a first current view on the image;

generating and transmitting a request to a server to cancel the provision of image data that was requested to set a previous view on the image, that is not necessary for the first current view, and that has not been received at the image drawing site; and generating and transmitting a request to the server to provide image data that is necessary to set the first current view on the image but that is not at the image drawing site.

2. The method of claim 1, further including generating a portion of the first current view at the image drawing site using image data that is at the image drawing site when request to provide is generated and transmitted.

3. The method of claim 2, further including:

receiving the requested image data; and generating the first current view using the requested data and the available data.

4. The method of claim 2, further including:

completing the first current view using the requested data and the available data.

5. The method of claim 1, further including:

following generating a portion, determining image data necessary for the image drawing site to replace the first current view with a second current view on the image, the image data necessary for the second current view including image data necessary for the first current view;

generating and transmitting a request to the server to provide image data that is necessary to set the second current view on the image but is not at the image drawing site;

generating and transmitting to the server to cancel the provision of image data that was requested to set the first current view, that is not necessary to set the second current view, and that has not been received at the image drawing site; and generating a portion of the second current view at the image drawing site using image data that was requested to set the first current view and that is at the image drawing site.

6. A client for accessing image data through a server, comprising:

an application process for receiving user requests for views on an image;

an image drawing process for determining image data necessary to generate a first current view on the image; and, a communications process for generating and transmitting a request to the server to cancel the provision of image data that was requested to set a previous view on the image, that is not necessary for the first current view, and that has not been received by the client, and for generating and transmitting a request to the server to provide image data that is necessary to set the first current view on the image but that is not at the client.

7. The client of claim 6, wherein the image drawing process is further for generating a portion of the first current view using image data that is at the client when the request to provide is generated and transmitted.

8. The client of claim 7, wherein the communications process is further for receiving the requested image data and the image drawing process is further for generating the first current view using the requested data and the available data.

9. The client of claim 7, wherein the image drawing process is further for completing the first current view using the requested data and the available data.

10. A method for serving image data from a server, comprising:

receiving a request from a client to open an image;

opening the image;

receiving from the client a request to provide image data that is necessary to set a first current view on the image;

receiving from the client a request to cancel the provision of image data that was requested to set the first current view; and transmitting to the client image data that was requested for the first current view and not cancelled.

11. A method of claim 10, further including:

preventing the acquisition from storage of image data for which a request to cancel was received; or, preventing the transmission to the client of image data acquired from storage and for which a request to cancel has been received.

12. A server for serving image data to a client, comprising:

a communications process for receiving a request from a client to open an image;

the communications process further for receiving from the client a request to provide image data for a first view on the image, and for receiving a request to cancel the provision of image data that was requested for the first current view and not cancelled; and storage access means for providing to the communications process image data from storage.

13. The server of claim 12, further including means for preventing the storage access means from acquiring image data for which a request to cancel was received, and means for preventing the communications process from transmitting to the client image data acquired from storage and for which a request to cancel has been received.

14. A method for processing image data in a client/server system in which image data is stored in a server and views on images are generated by clients, comprising:

determining image data requested for generating views on an image at a client; and streaming requests from the client to a server for units of image data to generate the views, the requests including requests to provide image data which is necessary to generate a current view at the client but which is not at the client and results to cancel the provision of image data previously requested, but not received, by the client.

15. The method of claim 12, further including streaming requests to the server from a plurality of clients for provision of image data and requests for cancellation image data.

* * * * *